Aug. 5, 1952                J. C. RHOADS                2,605,852
              STEERING CONTROL FOR TRACK LAYING VEHICLES
                        Filed Feb. 15, 1951
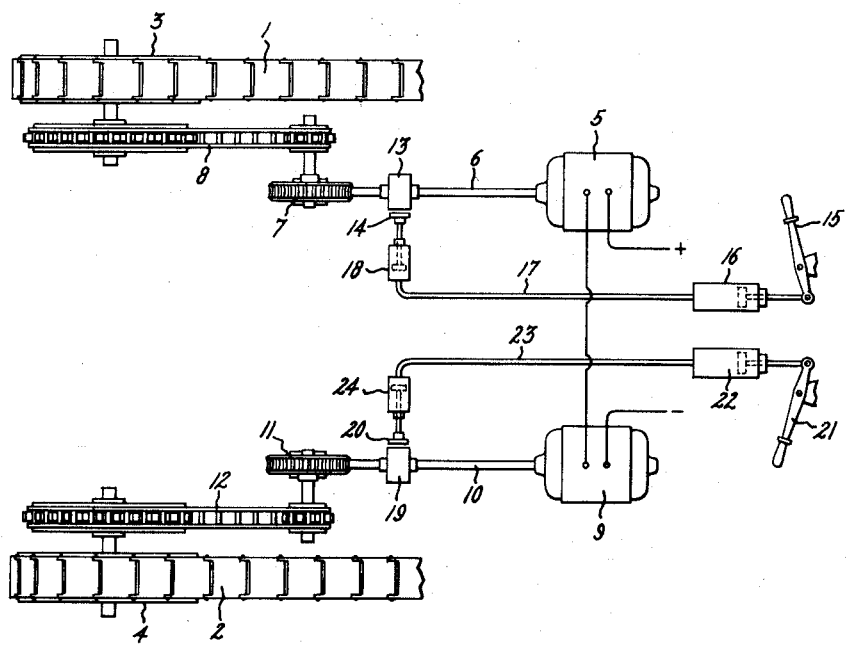
Inventor:
James C. Rhoads,
by Ernest C. Britton
His Attorney.

UNITED STATES PATENT OFFICE 2,605,852

STEERING CONTROL FOR TRACK LAYING VEHICLES

James C. Rhoads, Erie, Pa., assignor to General Electric Company, a corporation of New York Application February 15, 1951, Serial No. 211,101

2 Claims. (Cl. 180—6.7)

This invention relates to electrically propelled track laying vehicles and more particularly to the means used to steer such vehicles.

Electrically propelled track laying vehicles, such as electric shovels or mine shuttle cars, having two laterally spaced endless tracks are usually steered by increasing the speed of one track relative to the speed of the other track. This results in the vehicle turning in the direction of the slower moving track. Since each track is commonly driven by a separate electric motor, one manner of changing the track speeds relative to each other is to change the speeds of the driving motors relative to each other. Although various methods of accomplishing this have been proposed, all of these previous methods have the common disadvantage of increasing the complexity of the electrical circuit associated with the motors. The various combinations of relays, rheostats, circuit breakers and reversing switches necessary to these methods not only increase the cost of manufacturing the vehicle but also make electrical failure in operation more likely. Moreover, most of these methods necessitate a current fluctuation in one or both of the drive motors, which retards the reapplication of full power immediately after turning. Some of the methods even require excitation to be dropped completely from the armature of one of the motors.

Accordingly, it is an object of this invention to provide for use in electrically driven track laying vehicles a steering control characterized by its simplicity.

Another object of this invention is to provide for use in electrically driven track laying vehicles a steering control which does not involve the addition of electrical control circuits to the drive motor circuits.

A further object of this invention is to provide for use in electrically driven track laying vehicles a steering control which permits full power application to the drive motors during turning of the vehicle.

Still a further object of this invention is to provide for use in electrically driven track laying vehicles a steering control which causes little or no current fluctuation in the drive motors.

This invention also has for its object the provision for use in electrically driven track laying vehicles of a steering control which in emergencies can be employed to limit the vehicle speed or to stop the vehicle.

In carrying this invention into effect in one form thereof, each of the two tracks of a track laying vehicle is driven by a separate series wound electric drive motor. The motors are connected in series across the power supply and in normal straight line operation of the vehicle, where the power supplied to both tracks is equal, run at the same speed, and have substantially equal voltage drops. A mechanical brake is mounted on the shaft of each drive motor and to turn the vehicle in one direction one brake is applied, while to turn in the other direction, the other brake is applied. The application of the brake on one shaft slows down the motor driving that shaft. This causes the counter voltage of the motor to drop and thereby reduces the voltage drop across the motor. Since the motors are in series the reduced voltage across the braked motor allows a greater voltage across the other motor and causes it to speed up. The reduced counter voltage on the slower motor is almost exactly compensated for by the increased counter voltage of the faster one and thereby there is essentially no increase in current. As soon as the turn is accomplished, the brake is released and the motors return to their original power outputs.

For a better and more complete understanding of my invention together with additional objects and advantages thereof, reference should now be had to the following description together with the accompanying drawing which is a schematic diagram of a preferred embodiment of the steering control of this invention.

Referring to the drawing the laterally spaced endless tracks 1 and 2 of a track laying vehicle are driven by sprockets 3 and 4 respectively. Sprocket 3 is driven by motor 5 through shaft 6, gears 7 and sprocket and chain drive 8. Similarly sprocket 4 is driven by motor 9 through shaft 10, gears 11 and sprocket and chain drive 12. Motors 5 and 9 are substantially identical series wound motors and are connected in series with each other to a source of electric power.

A brake drum 13 is mounted on shaft 6. The brake shoe 14 associated with the drum 13 is hydraulically actuated by lever 15 through master cylinder 16, connecting tube 17 and brake cylinder 18. A similar brake drum 19 is mounted on shaft 10, and the brake shoe 20 associated with it is hydraulically actuated by lever 21 through master cylinder 22, connecting tube 23 and brake cylinder 24.

With the vehicle moving in normal straight line operation, endless tracks 1 and 2 move at the same speed, as do their driving motors 5 and 9. Motors 5 and 9, producing substantially equal power outputs and being connected in series so that the same current flows through both, have substantially equal voltage drops. Now to turn in one direction, lever 15 is applied while to turn in the other direction lever 21 is applied. Assuming, for example, that lever 15 is applied, then brake shoe 14 is actuated and engages brake drum 13. The resultant braking action slows down motor 5 and consequently track 1. As motor 5 slows down, its counter voltage and thus the voltage across it decreases. The supply voltage remaining constant, the voltage across motor 9 increases the amount the voltage across motor 5 has decreased. The increased voltage across motor 9 causes it to speed up thereby increasing the speed of track 2. Track 2 now moving appreciably faster than track 1, the vehicle will turn toward track 1. Since the reduced counter voltage of motor 5 as it slows down is almost exactly compensated for by the increased counter voltage of motor 9 as it speeds up, there is virtually no change in the current flowing through the two motors. Moreover, when lever 15 is released ending the braking action on motor 5, both motors return to their original speeds with little or no change in the current, the counter voltage of motor 5 rising as that of motor 9 drops.

To turn in the opposite direction, lever 21 is applied to brake motor 9. The exact reverse procedure of that described above occurs; motor 5 speeds up while motor 9 slows down and the vehicle turns toward track 2.

The brake shoes as shown in the diagram are described above as actuated by hydraulic systems controlled by levers. However, either mechanical linkage or electrical means can be used to transmit the motion of the levers to the brake shoes if for some reason it is desired not to use hydraulic systems.

Besides its simplicity and other desirable characteristics, such as full power application during the turning process with little or no current fluctuation in the drive motors, another advantage of this new type steering control is that in emergencies, it can be used to limit the speed of the vehicle or to stop it completely. By pulling on both steering levers at once, equal braking can be applied to both motors to slow down or stop the vehicle. Of course, to avoid damaging the motors, over current protection is necessary in the drive motor circuit.

Although in accordance with the provisions of the patent statutes, this invention is described as embodied in concrete form and the principle thereof has been explained together with the best mode in which it is now contemplated applying that principle, it will be understood that the elements shown and described are merely illustrative and that the invention is not limited thereto since alterations and modifications will readily suggest themselves to persons skilled in the art without departing from the true spirit of this invention or from the scope of the annexed claims.

What I claim as new and desire to secure by Letters Patent of the United States is:

1. In a track laying vehicle having two laterally spaced endless tracks, a steering control comprising two series wound electric motors connected for series energization, mechanical driving connections between each of said motors and a corresponding one of said tracks to drive said tracks, a separate mechanical brake for each of said motors, and a separate brake applying device for each of said brakes to provide selective braking of said motors whereby application of one of said brakes causes slowing of its associated motor so that the voltage across the other of said motors increases causing an increase in speed of said other motor to effect steering of said vehicle.

2. In a track laying vehicle having two laterally spaced endless tracks, a steering control comprising two series wound electric motors connected for series energization, mechanical driving connections between each of said motors and a corresponding one of said tracks to drive said tracks, a separate mechanical brake for each of said motors respectively including a braked rum mounted on the corresponding of said mechanical driving connections and a brake shoe for engaging said drum, and a separate brake shoe applying device for each of said motors to provide selective braking of said motors whereby application of one of said brakes causes slowing of its associated motor so that the voltage across the other of said motors increases causing an increase in speed of said other motor to effect steering of said vehicle.

JAMES C. RHOADS.

REFERENCES CITED

The following references are of record in the file of this patent:

UNITED STATES PATENTS

| Number | Name | Date |
| --- | --- | --- |
| 724,021 | Lemp | Mar. 31, 1903 |
| 1,435,910 | Bailard | Nov. 21, 1922 |
| 2,393,618 | Edwards et al. | Jan. 29, 1946 |